United States Patent [19]
Jensen et al.

[11] Patent Number: 5,112,923
[45] Date of Patent: May 12, 1992

[54] IMIDE/ARYLENE ETHER COPOLYMERS

[75] Inventors: Brian J. Jensen, Williamsburg; Paul M. Hergenrother, Yorktown; Robert G. Bass, Richmond, all of Va.

[73] Assignee: Administrator of the National Aeronautics and Space Administration, Washington, D.C.

[21] Appl. No.: 439,317

[22] Filed: Nov. 21, 1989

[51] Int. Cl.⁵ .............................................. C08L 79/08
[52] U.S. Cl. ................................... 525/420; 525/434; 525/436
[58] Field of Search ................... 525/434, 420, 436

[56] References Cited
U.S. PATENT DOCUMENTS 4,870,155  9/1989  Motzner et al. ............... 528/229
4,873,295  10/1989  Kurosawa et al. ............ 525/420

Primary Examiner—Ana L. Carrillo
Attorney, Agent, or Firm—George F. Helfrich

[57] ABSTRACT

Imide/arylene ether block copolymers are prepared by reacting anhydride terminated poly(amic acids) with amine terminated poly(arylene ethers) in polar aprotic solvents and chemically or thermally cyclodehydrating the resulting intermediate poly(amic acids). The resulting block copolymers have one glass transition temperature or two, depending upon the particular structure and/or the compatibility of the block units. Most of these block copolymers form tough, solvent resistant films with high tensile properties.

7 Claims, No Drawings

IMIDE/ARYLENE ETHER COPOLYMERS

ORIGIN OF THE INVENTION

The invention described herein was made jointly in the performance of work under a NASA Grant and by employees of the U.S. Government. In accordance with 35 U.S.C. 202, the grantee elected not to retain title.

BACKGROUND OF THE INVENTION

1. Field of the Invention

The present invention relates generally to high performance structural resins for advanced aerospace applications. It relates in particular to a series of imide-/arylene ether block copolymers which find special utility as adhesives and composites.

2. Description of Related Art

Polyimides are condensation polymers commonly synthesized by the reaction of aromatic dianhydrides with aromatic diamines. The intermediate poly(amic acid) is either thermally or chemically cyclodehydrated to form the polyimide which has a repeat unit of the general type

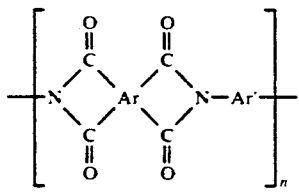

Ar is a tetravalent aromatic radical, which can be as simple as a 1,2,4,5-tetrasubstituted benzene, or it may be a bis-4-(o-diphenylene) having the general structure

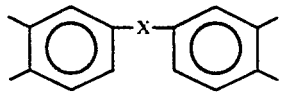

where X=nil, O, S, SO$_2$, C=O, etc. Ar may be any other appropriate tetravalent radical. Ar' is a divalent aromatic radical which may be 1,3-phenylene, 1,4-phenylene, 4,4'-biphenylene, 4,4'-oxydiphenylene, 4,4'-thiodiphenylene, 4,4'-carbonyldiphenylene, 4,4'-methanediphenylene or any other appropriate divalent radical.

Synthesis and characterization of polyimides has been extensively reported in the literature. The preparation of aromatic polyimides by reaction of an aromatic dianhydride with an aromatic diamine, followed by thermal cyclization was first reported in 1963 (G. M. Bower and L. W. Frost, *J. Polym. Sci.* A1, 3134 (1963)) with patents awarded in 1965 (W. M. Edwards, U.S. Pat. Nos. 3,179,614 and 3,179,634 and A. L. Endrey, U.S. Pat. Nos. 3,179,631 and 3,179,633). Several reviews on polyimides have been published (C. E. Sroog, "Polyimides" in *Encyclopedia of Polymer Sci. and Technology* [H. F. Mark, N. G. Gaylord and N. M. Bikales, ed.] Interscience Pub., New York, 1969, Vol. 11, pp. 247-272; N. A. Adrova, M. I. Bessonov, L. A. Lauis and A. P. Rudakov, Polyimides, Technomic Pub. Co., Inc., Stamford, CT, 1970).

Wholly aromatic polyimides are known for their exceptional thermal, thermooxdidative and chemical resistance but are generally difficult to process as structural adhesives or composite matrices. Several polyimides such as Kapton® (DuPont), PI-2080 (Upjohn), XU-218 (Ciba-Geigy), Ultem® (General Electric) and LaRC-TPI (Mitsui Toatsu) are commercially available and used as films, moldings, adhesives and composite matrices.

Poly(arylene ethers) are condensation polymers commonly synthesized by nucleophilic displacement of activated aromatic halides in polar solvents by alkali metal phenates to form a repeat unit of the general type

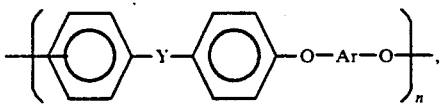

wherein Ar is arylene and Y=C=O, SO$_2$,

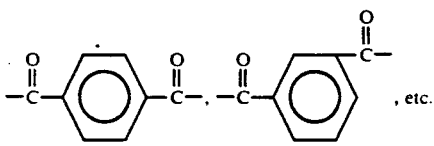

Nucleophilic displacement reactions leading to high molecular weight poly(arylene ethers) were initially reported in 1958 (A. Kreuchumas, U.S. Pat. No. 2,822,351). Since then numerous papers and patents have appeared, such as: R. N. Johnson, et. al., *J. Polym. Sci.* A-1, 5, 2375 (1967); S. V. Vinogradova, et. al., *Polym. Sci. USSR*, 14, 2963 (1972); J. B. Rose, *Polymer*, 15, 456 (1974); T. E. Attwood et al., *Polym. Prepr.*, 20(1), 191 (1979); T. E. Attwood, et. al., *Polymer*, 22, 1096 (1981); R. Viswanathan, et. al., *Polymer*, 25, 1927 (1984); P. M. Hergenrother, et. al., *Polymer*, 29, 258 (1988); M. E. B. Jones, British Patent 1,016,245; H. A. Vogel, British Patent 1,060,546; I. Goodman, et. al., British Patent 971,277 (1964); A. G. Farnham et. al., British Patent 1,078,234; and A. G. Farnham, U.S. Pat. No. 4,175,175.

Poly(arylene ethers) are known for their good mechanical properties, good thermooxidative stability, relative ease of processing, and solubility in common organic solvents. For certain applications, resistance to common organic solvents is a requirement. Several poly(arylene ethers) such as Udel® polysulfone (Amoco), Kadel® polyketone (Amoco), PEEK® polyetheretherketone (ICI) and Victrex® PES polyethersulfone (ICI) are commerically available and used as films, moldings, adhesives and composite matrices.

Amine terminated arylene ethers have been prepared by several different methods. The preparation of amine terminated polysulfone oligomers using p-aminophenol as the end-capping compound was reported in 1974 (J. H. Kawakami, et. al., *J. Polym. Sci. Polym. Chem Ed.*, 12, 565 (1974)). More recently, the preparation of amine terminated polysulfone and poly(arylene ether ketone) oligomers using m-aminophenol and 4-aminophenyl-4'-hydroxyphenyl-2-2-isopropylidene has been reported (M. J. Jurek, et. al., *Polym. Prepr.*, 26(2), 283 (1985); G. D. Lyle, et. al., *Polym. Prepr.*, 28(1) 77 (1987)).

It is accordingly the primary object of the present invention to synthesize a series of block copolymers containing polyimide and poly(arylene ether) segments employing a wide variety of imide and arylene ether repeat units and varying block length to give copolymers with specific desired properties.

SUMMARY OF THE INVENTION

According to the present invention, the foregoing and additional objects were obtained by synthesizing a series of imide/arylene ether copolymers by reacting anhydride terminated poly(amic acids) and amine terminated poly(arylene ethers). After curing, the resulting block copolymers had glass transition temperatures from 165° C. to 270° C. Some had two glass transitions, corresponding to the arylene/ether segment and the imide segment, indicating a phase separation in the films due to polymer-to-polymer incompatibility. Data for polymer and copolymer inherent viscosities and glass transition temperatures are included in Tables I–III herein. Solution cast films of the block copolymers were tough and flexible with tensile strength, tensile moduli and elongation at break up to 16,200 psi, 431,00 psi and 23%, respectively at 25° C. And, depending on the glass transition temperature of the arylene/ether segments, some block copolymers maintained good mechanical properties at 93° C. and 177° C. Data for polymer and copolymer film properties are included in Table IV herein. The imide/arylene ether block copolymers of the present invention are eminently suitable as adhesives and composites for advanced aerospace applications.

DESCRIPTION OF THE PREFERRED EMBODIMENTS

The general reaction sequence for the block copolymers is represented by the following equation:

Cyclodehydration is accomplished chemically or by heating the intermediate poly(amic acid) at temperature exceeding 150° C.

PAA is representative of a poly(amic acid) synthesized by reacting excess dianhydride with a diamine as generically shown below:

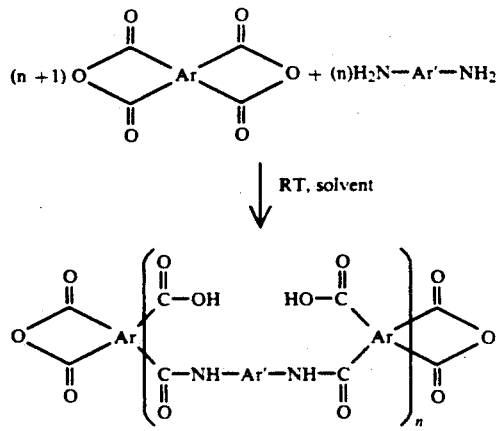

where: n is an integer from 4–100 repeat units. Solvent is preferably N,N-dimethylacetamide, but may be N-methylpyrrolidinone, m-cresol, N,N-dimethylformamide, dimethyl sulfoxide or ether solvents such as diglyme.

Ar is selected from a group of radicals consisting of

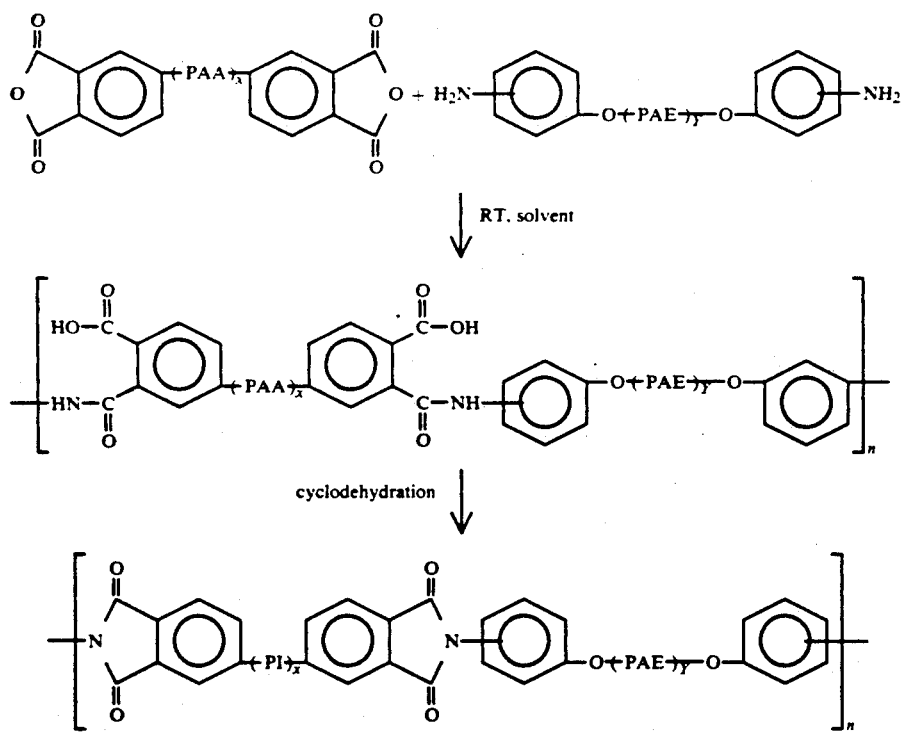

where: n is an integer from 4–100 repeat units. Solvent is preferably N,N-dimethylacetamide, but may be N-methylpyrrolidinone, m-cresol, N,N-dimethylformamide, dimethyl sulfoxide or ether solvents such as diglyme.

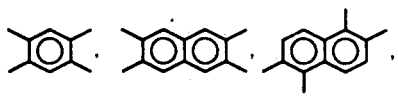

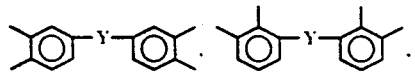

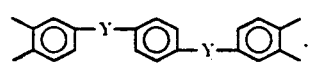

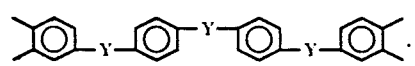

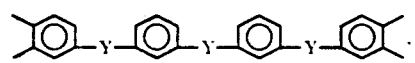

and mixtures thereof, wherein Y=nil, O, S, O=C, SO$_2$, CH$_2$, C(CH$_3$)$_2$, or C(CF$_3$)$_2$.

Ar' is selected from a group of radicals consisting of

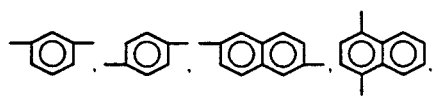

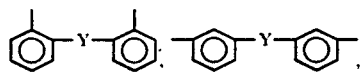

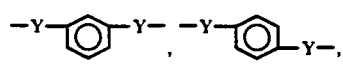

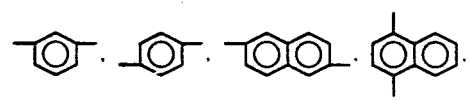

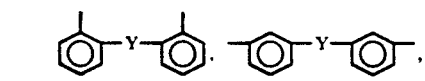

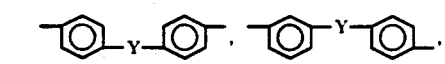

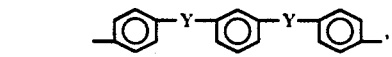

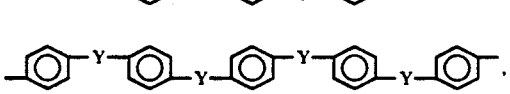

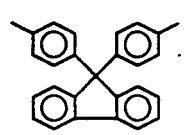

and mixtures thereof, wherein Y=nil, O, S, O=C, SO$_2$, CH$_2$, C(CH$_3$)$_2$, or C(CF$_3$)$_2$.

PAE is representative of a poly(arylene ether) synthesized by reacting an activated aromatic dihalide with a bisphenol as generically shown below:

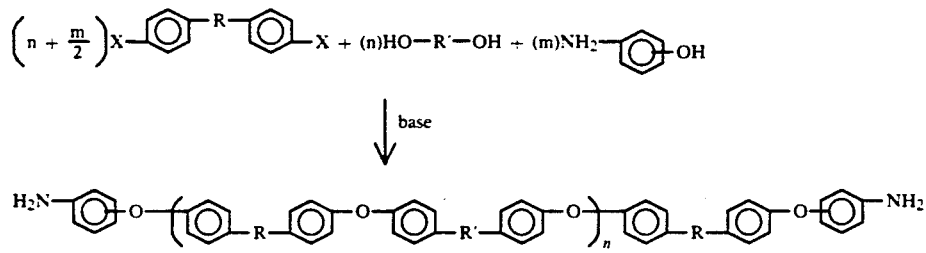

where: n is an integer from 4–100 repeat units.

Solvent is preferably N,N-dimethylacetamide, but may be other solvents such as N-methylpyrrolidinone, N,N-dimethylformamide or dimethyl sulfoxide.

X is either a fluorine or chlorine atom. Base is an alkali metal hydroxide or carbonate selected from NaOH, KOH, Na$_2$CO$_3$ or K$_2$CO$_3$.

R and R' are selected from a group of aromatic radicals consisting of wherein Y=nil, O, S, O=C, SO$_2$, CH$_2$, C(CH$_3$)$_2$, C(CF$_3$)$_2$, and mixtures thereof, and

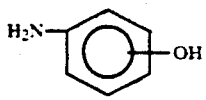

represents either 3-aminophenol or 4-aminophenol.

EXAMPLES

Example I

The following example illustrates the reaction sequence for the synthesis of imide/arylene ether block copolymer where Ar is

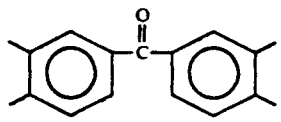

Ar' is

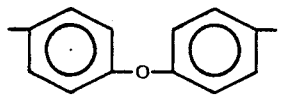

R is

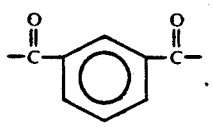

X is F and R' is

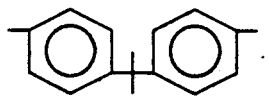

The theoretical number average molecular weight ($\overline{M}_n$) of both the poly(amic acid) block and the poly(arylene ether) block is 6545 g/mole.

The invention is not limited to these examples.

Amine Terminated Poly(Arylene Ether)

1,3-Bis(4-fluorbenzoyl)benzene (1,3-FBB) (0.1 m, 32.2315 g), 2,2-bis(4-hydoxyphenyl)propane (BPA) (0.0925 m, 21.1172 g), 4-aminophenol (0.015 m, 1.637 g), powdered potassium carbonate (0.22 m, 30.4 g), N,N-dimethylacetamide (DMAc) (150 ml) and toluene (40 ml) were added to a three-neck flask equipped with a Dean-Stark trap and nitrogen purge. The reaction was stirred heated to 155° C. during about four hours while collecting a toluene/water azeotropic mixture and held at 155° C. overnight. The reaction was filtered, neutralized with a small amount of acetic acid and precipitated in water. After washing and boiling in water, drying at 80° C. in vacuum, a light tan solid was provided in >95% yield. The resulting amine-terminated arylene ether oligomer had $\eta_{Inh}$=0.29 dL/g in DMAc at 25° C.

Anhydride Terminated Poly(Amic Acid)

3,3',4,4'-Benzophenonetetracarboxylic acid dianhydride (BTDA) (0.007 m, 2.2556 g) was added to a solution of oxydianiline (ODA) (0.006464 m, 1.2943 g) and DMAc (17.75 ml) and stirred for three hours to provide a viscous, clear yellow solution.

Imide/Arylene Ether Block Copolymer

The amine-terminated arylene ether (3.5499 g) was dissolved in DMAc (17.75 ml) to provide a clear brown solution which was added to the anhydride-terminated poly(amic acid) solution. The combined solution became cloudy instantly and very viscous within one hour ($\eta_{Inh}$=1.37 dL/g in DMAc at 25° C.). Casting onto plate glass and curing one hour each at 100° C., 200° C., and 300° C. provided a tough, flexible, clear yellow film ($T_g$=165° C. and 268° C., DSC at 20° C./min). If the solution is not stirred for long periods (about one week), two distinct layers will separate indicating polymer incompatibility in DMAc.

Example II

The following example illustrates the sequence for the synthesis of imide/arylene ether block copolymer where Ar is

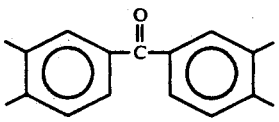

Ar' is

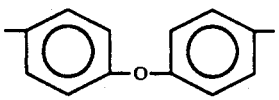

R is

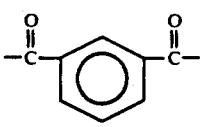

X is F, and R' is

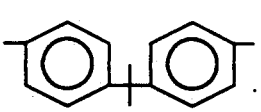

The theoretical number average molecular weight ($\overline{M}_n$) of both the poly(amic acid) block and the poly(arylene ether) block is 3110 g/mole.

The invention is not limited to these examples.

Amine Terminated Poly(Arylene Ether)

1,3-Bis(4-fluorobenzoyl)benzene (1,3-FBB) (0.07 m, 22.562 g), 2,2-bis(4-hydroxyphenyl)propane (BPA) (0.0595 m, 13.583 g), 4-aminophenol (0.021 m, 2.292 g), powdered potassium carbonate (0.154 m, 21.3 g), N,N-dimethylacetamide (DMAc) (115 ml) and toluene (40 ml) were added to a three-neck flask equipped with a Dean-Stark trap and nitrogen purge. The reaction was stirred and heated to 155° C. during about four hours while collecting a toluene/water azeotropic mixture and held at 155° C. overnight. The reaction was filtered, neutralized with a small amount of acetic acid and precipitated in water. After washing and boiling in water, drying at 80° C. in vacuum, a light tan solid was provide in >95% yield. The resulting amine-terminated arylene ether oligomer had $\eta_{inh}=0.16$ dL/g in DMAc at 25° C.

Anhydride Terminated Poly(Amic Acid)

3,3',4,4'-Benzophenonetetracarboxylic acid dianhydride (BTDA) (0.007 m, 2.2556 g) was added to a solution of oxydianiline (ODA) (0.005915 m, 1.1844 g) and DMAc (17.2 ml) and stirred for three hours to provide a clear yellow solution.

Imide/Arylene Ether Block Copolymer

The amine-terminated arylene ether (3.3744 g) was dissolved in DMAc (17.2 ml) to provide a clear brown solution which was added to the anhydride-terminated poly(amic acid) solution. This represents 1.9 weight % less ATPAE than is required to reach 1:1 stoichiometry in an effort to control molecular weight. The combined solution became cloudy instantly and viscous within one hour ($\eta_{inh}=0.46$ dL/g in DMAc at 25° C.). Casting onto plate glass and curing one hour each at 100° C., 200° C., and 300° C. provided a tough, flexible, clear yellow film ($T_g=168$° C., DSC at 20° C./min). If the solution is not stirred for long periods (about one week), two distinct layers will separate indicating polymer incompatibility in DMAc.

EXAMPLE III

The following example illustrates the reaction sequence for the synthesis of the imide/arylene ether segmented copolymer when Ar is

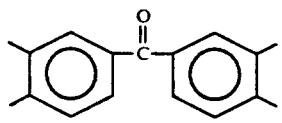

Ar' is

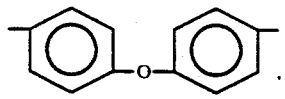

R is

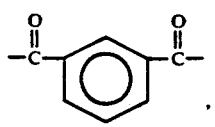

X is F and R' is

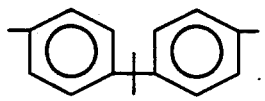

The theoretical $\overline{M}_n$ of the poly(arylene ether) block is 6545 g/mole while the poly(amic acid) segment is random length but whose average $\overline{M}_n=6545$ g/mole. The method of addition of starting materials leads to a different final structure for this copolymer from the copolymer described in Example I.

Amine Terminated Poly(Arylene Ether)

The material is the same as the material prepared for Example I.

Imide/Arylene Ether Semi-Block Copolymer

This copolymer was prepared with the poly(amic acid) segment synthesized in the presence of the AT-PAE, not separately as in Example I.

ODA ($2.77\times10^{-3}$ m, 0.5547 g) and ATPAE ($2.32\times10^{-4}$ m, 1.5214 g) were dissolved in DMAc (17.24 g). Addition of BTDA (0.003 m, 0.9667 g) produced a cloudy solution immediately that became very viscous within about two hours ($\eta_{inh}=0.97$ dL/g in DMAc at 25° C.). Casting onto plate glass and curing one hour each at 100° C., 200° C., and 300° C. provided a tough, flexible, clear yellow film ($T_g=168$° C. and 265° C., DSC at 20° C./min). After standing for longer than four hours, the solution was clear yellow and had not separated into two layers.

The following Table I details the characterization of oligomers and polymers; Table II details the characterization of block copolymers; Table III details the characterization of polymers; and Table IV sets forth details of film properties obtained.

TABLE I
CHARACTERIZATION OF OLIGOMERS AND POLYMERS

| ATPAE oligmer | ANHYDRIDE | $n_{inh}$. dL/g | Tg. °C.[c] |
|---|---|---|---|
| 3110 | — | 0.16[a] | 133 |
| 6545 | — | 0.29[a] | 146 |
| 3110 | BTDA(molar amt.) | 0.79[b] | 165 |
| 6545 | BTDA(molar amt.) | 1.1[b] | 162 |

[a]Measured in CHCl₃ @ 25° C. and 0.5% concentration
[b]Measured in DMAC @ 25° C. and 0.5% concentration
[c]Measured by DSC at a heating rate of 20° C./min after curing 1 h @ 300° C.

TABLE II
CHARACTERIZATION OF BLOCK COPOLYMERS

| ATPAE oligmers | ODA/BTDA oligmers | Polyamic acid $n_{inh}$. dL/g[a] | Polyimide Tg. °C. DSC[b] | TBA[c] |
|---|---|---|---|---|
| 3110 | 3110 | 0.46 | 168 | 216 |
| 3110 | 6545 | 0.50 | 167, 265 | 267 |
| 6545 | 3110 | 0.38 | 164 | 176 |
| 6545 | 6545 | 0.37(1.37) | 171, 265 | 214 |

[a]Measured in DMAC @ 25° C. and 0.5% concentration
[b]Measured by DSC at a heating rate of 20° C./min after curing 1 h @ 300° C.
[c]Measured by TBA at a heating rate of 3° C./min after curing 1 h @ 300° C.

TABLE III
CHARACTERIZATION OF POLYMERS

| Polymer | $n_{inh}$. dL/g | Tg. °C.[c] |
|---|---|---|
| ODA + BTDA | 1.59(PAA)[a] | 278(PI) |
| FBB + BPA | 0.70[b] | 155 |
| PI + PAE (1:1 blend) | — | 155, 273 |
| ATPAE 6545 + ODA + BTDA (6545) | 0.97[a] | 168, 265 |

[a]Measured in DMAC @ 25° C. and 0.5% concentration
[b]Measured in CHCl₃ @ 25° C. and 0.5% concentration
[c]Measured by DSC at a heating rate of 20° C./min after curing 1 h @ 300° C.

TABLE IV

| Polymer | Film Properties | | | | | | | | |
|---|---|---|---|---|---|---|---|---|---|
| | Tensile strength, ksi | | | Tensile modulus, ksi | | | Elongation, % | | |
| | RT | 93° C. | 177° C. | RT | 93° C. | 177° C. | RT | 93° C. | 177° C. |
| ATPAE 3110/BTDA | 10.9 | 9.1 | 1.2 | 367 | 333 | 124 | 4.0 | 3.3 | 80 |
| ATPAE 6545/BTDA | 11.1 | 8.5 | — | 367 | 329 | — | 5.7 | 5.2 | >100 |
| ATPAE 3110//ODA/BTDA 3110 | 14.1 | 11.7 | 3.8 | 415 | 400 | 158 | 4.9 | 4.9 | 10.3 |
| ATPAE 3110//ODA/BTDA 6545 | 16.2 | 13.0 | 6.2 | 431 | 389 | 50 | 5.7 | 5.3 | 19.1 |
| ATPAE 6545//ODA/BTDA 3110* | 5.8 | 4.2 | — | 321 | 268 | — | 1.9 | 1.9 | — |
| ATPAE 6545//ODA/BTDA 6545* | 11.2 | 9.4 | 3.9 | 324 | 299 | 60 | 4.6 | 4.6 | 17.7 |
| ATPAE 6545 + ODA + BTDA (6545) | 15.4 | 11.5 | 11.7 | 358 | 363 | 354 | 23.2 | >50 | >50 |
| ODA/BTDA | 19.5 | 15.7 | 9.6 | 526 | 393 | 290 | 14.6 | 24.4 | 18.2 |
| BPA/FBB | 12.7 | 7.6 | — | 381 | 340 | — | 136 | 124 | — |
| PI + PAE (1:1 blend) | 9.1 | 5.9 | — | 289 | 200 | — | 7.5 | 9.0 | — |

*Textured, orange peel surface

What is claimed is:

1. An imide/arylene ether block copolymer prepared by reacting an anhydride terminated poly(amic acid) and an amine terminated poly(arylene ether) in a polar aprotic solvent selected from the group consisting of N,N-dimethylacetamide, N-methylpyrrolidinone, m-cresol, N,N-dimethylformamide, dimethyl sulfoxide, and ethers, and cyclodehydrating the intermediate poly(amic acid).

2. The imide/arylene ether block copolymer of claim 1, wherein:

A. the anhydride terminated poly(amic acid) has the general formula:

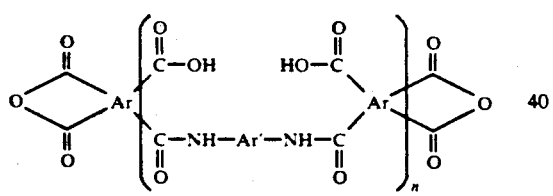

wherein
n is an integer from 4–100;
Ar is selected from the group of radicals consisting of

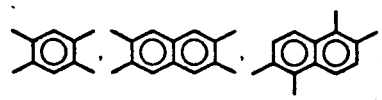

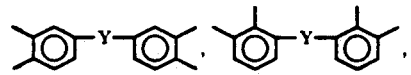

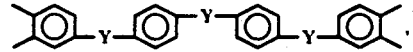

-continued

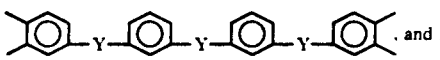

wherein
Y is a bond or is selected from the group consisting of O, S, O=C, SO$_2$, CH$_2$, C(CH$_3$)$_2$, and C(CF$_3$)$_2$; and
Ar' is selected from the group of radicals consisting of

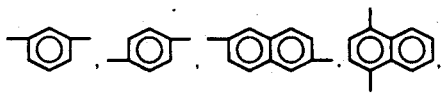

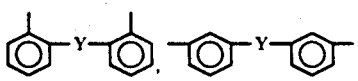

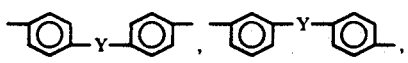

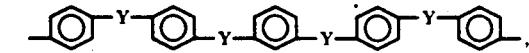

wherein Y is a bond or is selected from the group consisting of O, S, O=C, SO$_2$, CH$_2$, C(CH$_3$)$_2$, and C(CF$_3$)$_2$; and B. the amine terminated poly(arylene ether) has the general formula:

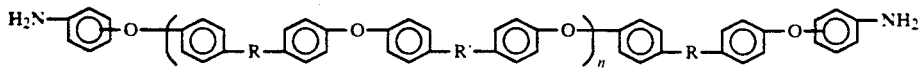

wherein
n is an integer from 4–100; and
R and R' are selected from the group of aromatic radicals consisting of

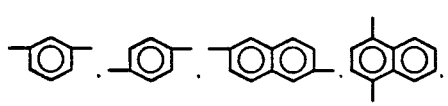

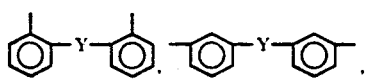

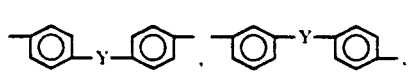

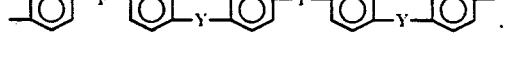

wherein Y is a bond or is selected from the group consisting of O, S, O=C, SO$_2$, CH$_2$, C(CH$_3$)$_2$, and C(CF$_3$)$_2$.

3. The imide/arylene ether block copolymer of claim 2, wherein:
Ar is

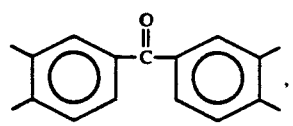

Ar' is

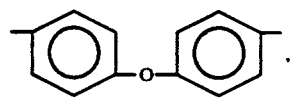

R is

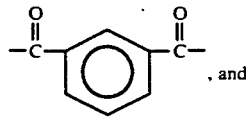

, and

R' is

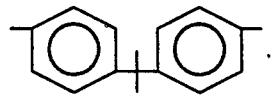

and wherein the theoretical number average molecular weight of both the poly(amic acid) block and the poly(arylene ether block) is between about 1000 g/mole and 10,000 g/mole.

4. The imide/arylene ether block copolymer of claim 2, wherein:
Ar is

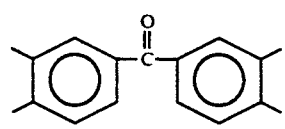

Ar' is

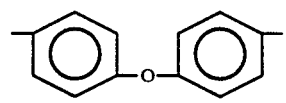

R is

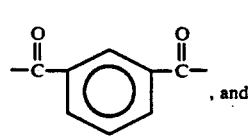

, and

R' is

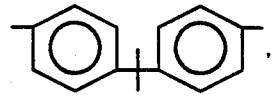

and wherein the theoretical number average molecular weight of both the poly(amic acid) block and the poly(arylene ether block) is about 3000 g/mole.

5. The imide/arylene ether block copolymer of claim 2, wherein:
Ar is

Ar' is

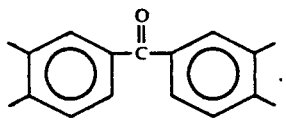

R is

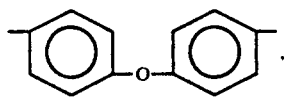

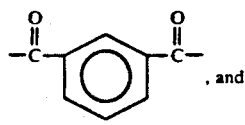, and

R' is

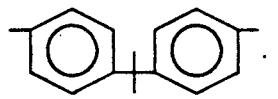

and wherein the theoritical number average molecular weight of both the poly(amic acid) block and the poly(arylene ether block) is about 6500 g/mole.

6. The imide/arylene ether segmented copolymer of claim 2, wherein:

Ar is

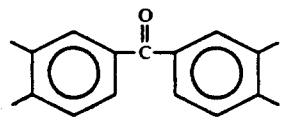

Ar' is

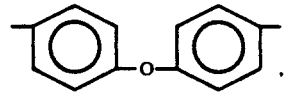

R is

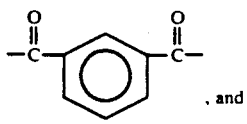, and

R' is

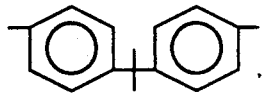

and wherein the theoretical number average molecular weight of the poly(arylene ether block) is between about 1000-10,000 g/mole, and the poly(amic acid) block is of random length but whose number average molecular weight is between about 1000-10,000 g/mole.

7. The imide/arylene ether segmented copolymer of claim 2, wherein:

Ar is

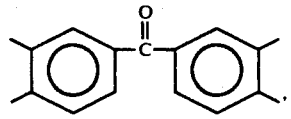

Ar' is

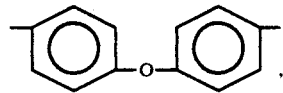

R is

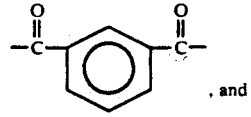, and

R' is

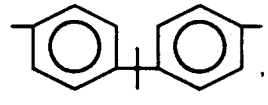

and wherein the theoretical number average molecular weight of the poly(arylene ether block) is 6545 g/mole, and the poly(amic acid) block is of radom length but whose number average molecular weight is 6545 g/mole.

* * * * *